C. OTTO.
PROCESS AND HIGH PRESSURE FURNACE FOR THE DIRECT PRODUCTION OF IRON AND STEEL.
APPLICATION FILED NOV. 1, 1911.
1,089,951.
Patented Mar. 10, 1914.
2 SHEETS—SHEET 1.
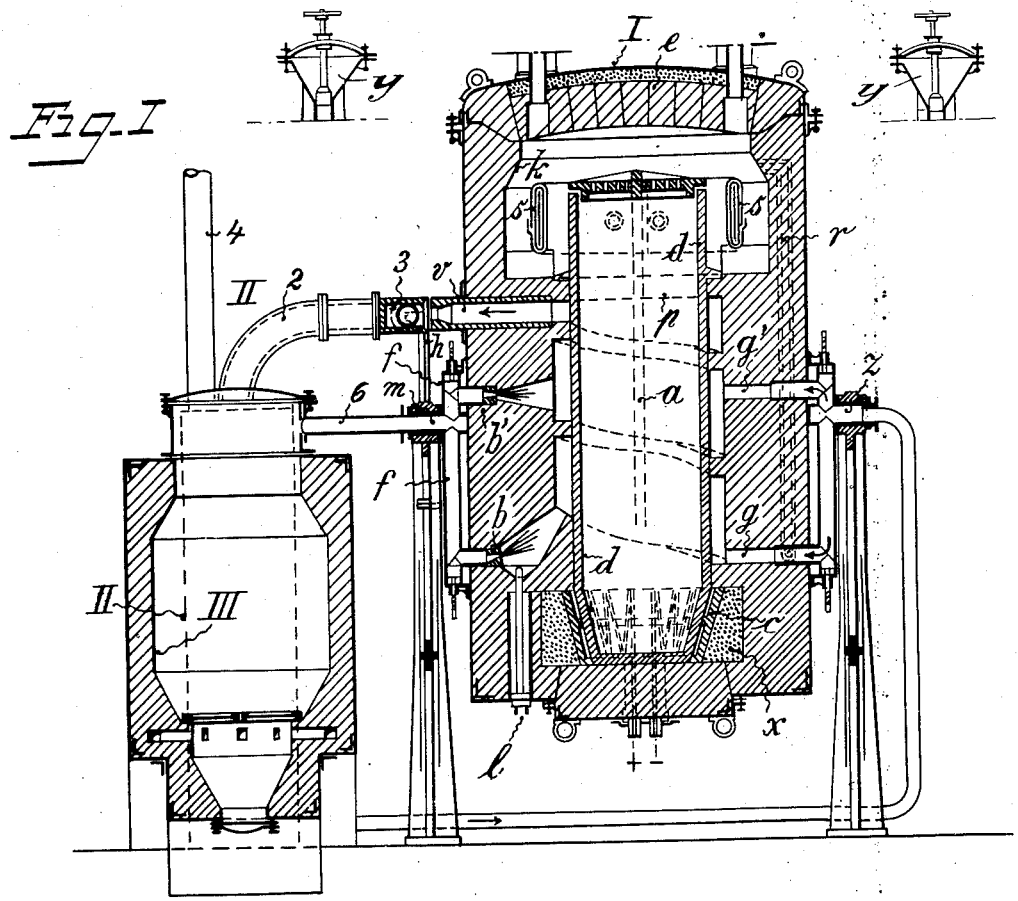
Fig. I
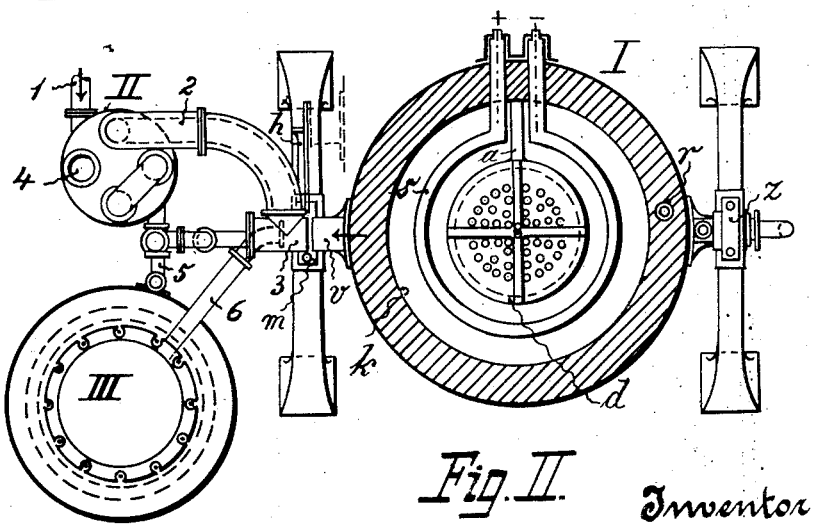
Fig. II
Witnesses:
Hubert G. Britz
Erich Pannehl
Inventor:
Carl Otto
by B. Singer
Attorney.

C. OTTO.
PROCESS AND HIGH PRESSURE FURNACE FOR THE DIRECT PRODUCTION OF IRON AND STEEL.
APPLICATION FILED NOV. 1, 1911.
1,089,951.
Patented Mar. 10, 1914.
2 SHEETS—SHEET 2.
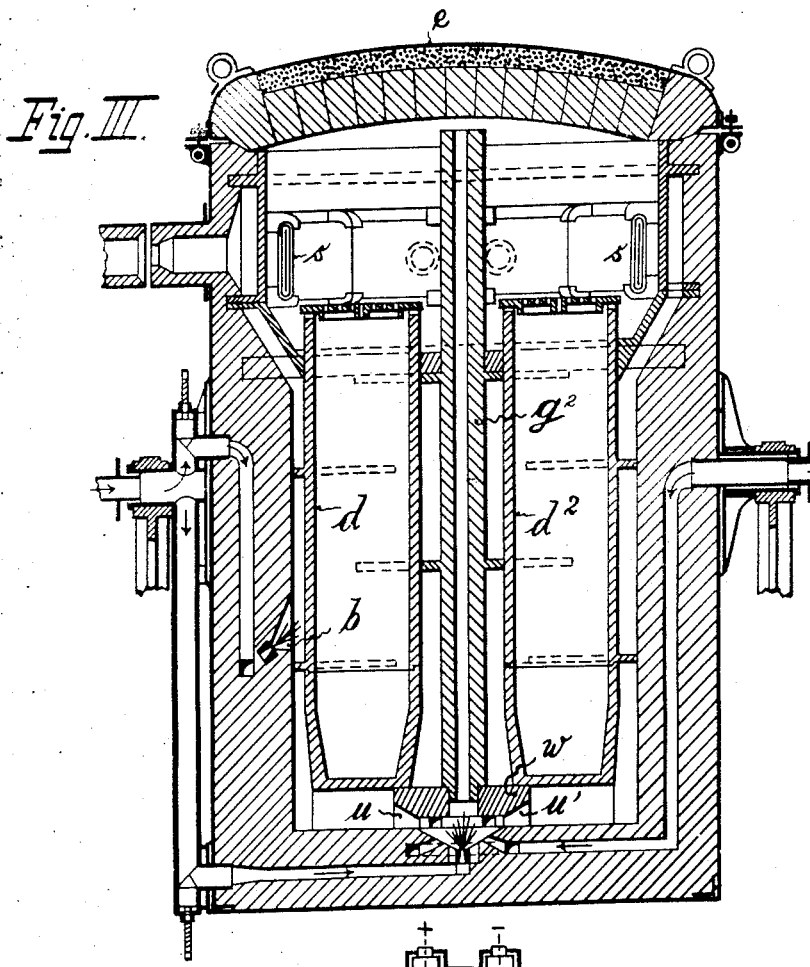
Fig. III.
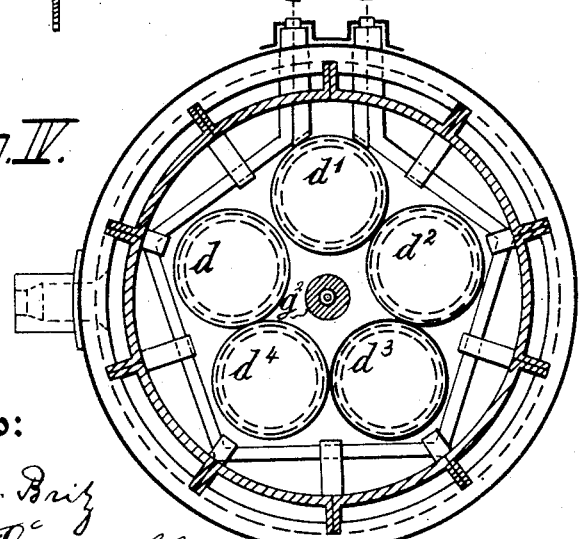
Fig. IV.
Witnesses:
Inventor:
Carl Otto

UNITED STATES PATENT OFFICE.

CARL OTTO, OF DRESDEN, GERMANY.

PROCESS AND HIGH-PRESSURE FURNACE FOR THE DIRECT PRODUCTION OF IRON AND STEEL.

1,089,951.  Specification of Letters Patent.  Patented Mar. 10, 1914.

Application filed November 1, 1911. Serial No. 657,978.

*To all whom it may concern:*

Be it known that I, CARL OTTO, a subject of the German Emperor, and residing at Dresden, Germany, have invented certain new and useful Improvements in Processes and High-Pressure Furnaces for the Direct Production of Iron and Steel, of which the following is a specification.

The reduction of iron ore brought into contact with carbon is successfully and nearly perfectly effected within a clay vessel heated from the outside and closed against the influence of the fire gases. According to the purity and degree of comminution of the ore a heat of from 800 to 900° C. only is required. A flimsy iron sponge and slags are formed which while not being molten retain deleterious admixtures. If this nearly chemically pure iron sponge is dissolved in a crude-iron or steel bath, an iron or steel bath is obtained of a property that cannot be obtained by refining the crude iron produced in blast furnaces. It is however essential that this crude-iron or steel bath contains no deleterious admixtures.

Admixtures consisting of sulfur, phosphorous manganese, etc., are reduced by the iron sponge until they lose their harmful properties, especially if the bath after being repeatedly carbonized during the following charges is made from its own steadily improving product.

One of the most essential requirements which must be met in order to obtain the best of results, is the perfect reduction of the ore. Such a perfect reduction of the ore cannot be obtained in open fire-places as in these, at the reduction of one-half of the ore, a chemical equilibrium prevails and the carbon dioxid tends to oxidize the iron sponge to the same degree as it is reduced by the carbon monoxid. Therefore the open furnace must be replaced by a high pressure blast furnace in which the chemical processes are carried out under a higher than atmospheric pressure and which upsets the chemical equilibrium by mechanical energy introduced from the outside which brings both gases under pressure. In the critical moment the carbon dioxid possibly could reoxidize the metallic iron formed during the process or could tend to form with the existing carbon still possessing its absorbing power a carbon monoxid, but owing to the pressure in the blast furnace the carbon dioxid is propelled toward the carbon and simultaneously the carbon monoxid is forced to an increased reducing activity. The volume of gas absorbed by the carbon is approximately proportionate to the pressure of the blast furnace. On account of the absorbed carbon dioxid gas the temperature sinks and the coefficient of the absorbing power of the carbon is increased. In consequence thereof the tension of disassociation is alternately set aside and the partial pressure on the other hand is increased and thus the chemical equilibrium is upset. Although in this manner the temporarily suspended process is proceeding the same is still in danger to be further retarded as soon as the mostly oxidulated residues of the ores have become very small on account of the velocity of the action having become proportional to the real active masses of the elements still possessing the power of reaction. In order to find the means for avoiding this suspension of the process, the following should be taken into consideration: The materials intended for the bath are molten by constantly increasing the heat generated by the combustion during constant volume. The heat produced however remains according to the carbon contained in the bath below 1400° C. The remaining oxidulated parts sink with the iron sponge into the bath but are not dissolved within the same. The bath during this time has time enough to absorb carbonic gas and to condense the same during the period of occlusion to such a degree that this carbon monoxid is powerful enough to transform the oxidulated residue into metallic iron as has been observed to take place in the cementing chests at a low temperature. However this transformation is only taking place as long as a sufficient quantity of carbonic gas is present above the bath during the melting process. It is difficult to maintain such a sufficient quantity of such carbonic gas or a reducing atmosphere above the bath because the iron or steel in their molten state have the tendency to reduce the carbonic gas brought into close relation with the same into its elementary components.

A comparatively large quantity of coal is required for quickly generating a sufficient quantity of the carbon monoxid. However it is essential that no carbon remain in the reduction and melting chamber in order to prevent the final product, iron or steel in fusion, from absorbing injurious matter from the slags or to prevent excessive carbonization. Therefore a larger quantity of coal must be stored in an auxiliary chamber until it is needed during the last stages of the process. This is suitably effected by feeding coal into a pocket of the vessel by means of a suitable filling apparatus. With such an apparatus a small quantity of finely comminuted iron oxid is fed to the auxiliary chamber in order to overcome the last mentioned interruption of the process, which is reduced to magnetite at 450° C. At the same time the developing carbon dioxid must quickly be transformed within the auxiliary chcamber into carbon monoxid and the temperature above the bath which is liable to reduce the same must be reduced by the removal of part of the heat.

The reaction between the carbon dioxid condensed within the pores of the carbon and the carbon takes place only at a temperature of about 1000° C. The storage chamber for the coal, requiring a considerable space can only be so arranged as to receive the heat freed from the source of heat. Thereafter the carbon must be heated to the temperature of reaction by pyroelectrical means. This pyroelectrical heating of the auxiliary coal chamber is effected on the inside by using a resistance material which for instance may be composed of carbid of silicon, which without burning can stand the heat at which the crude iron is melting and which is chemically not changed by gases. This electric heating body is insulated from the carbon by a cover of quartz or chamotte. The electric auxiliary heating device is put into operation at an early moment and oils are mixed with as much of the charcoal or charcoal of peat as is necessary to start the process of reaction. The larger quantity of the reducing carbon is stored in the electrically heated auxiliary chamber. It may consist of charcoal of peat of an inferior quality, of coke dross or of hard coal of an inferior quality or even of brown coal as their sulfurous or phosphorous elements are kept separated from the iron produced in the furnace. By this arrangement the necessary heat for the process of reduction is mainly developed within the carbon chamber.

In the melting chamber only reaction temperature is maintained as for the reduction an increase in the heat from the exterior is not necessary. If for instance 1 kg. is to be produced from 1.428 kg. iron oxid by employing 0.321 kg. carbon, 1800 caloric units are formed upon the transformation of the carbon into carbon monoxid and its combustion with the oxygen of the ore to carbon dioxid, while theoretically only 1770 caloric units are required for the reduction of the ore. On the other hand a considerable amount of the heat from the source of heat is consumed during the re-formation of the carbon dioxid into carbon monoxid. Even when using the oxygen freed from the carbon dioxid after the process of absorption, and which forms in the carbon a new combination with the carbon to carbon monoxid, only 2473 caloric units for 1 kg. coal are produced while 5607 caloric units are required for the re-formation of the carbon dioxid. The exterior source of heat must therefore in combination with the electrically generated heat add 3134 caloric units. Such a quantity of heat cannot be absorbed by 1 kg. of the coal on account of the inferior heat absorbing capacity of the coal used.

Only the fact that in each small piece of coal the chemical process is reproduced with potentialized development of heat within a very small capillary or smallest possible space, enables the preparation of the energy required at the right time during each step of the process.

Before subjecting the process of gasification accelerated under pressure, to the influence of a heat of 1000° C., the carbon dioxid must have been condensed within the fine pores of the coal under development of heat. This condensation is effected by the heat absorbing capacity of the coal. The carbon monoxid derived from the carbon dioxid by the addition of carbon, in its first stages still has the density of the carbon dioxid in that state bordering on solid aggregation. The carbon monoxid leaves this state and changes into the state of gaseous aggregation only by expansion after absorption of a great volume of external heat when it requires a larger space for its expansion.

The time consumed in developing the supplementary heat in the widely separated particles of carbon is of considerable influence upon the time consumed by the entire process and this time is considerably abbreviated by the direct introduction of electrically developed heat. It is moreover of great advantage to bring the bath to an early melting by exteriorly developed powerful electric energy. In this manner which makes use of the pressure and the changes of temperature, it is possible to introduce even during the final stages of the process such masses of materials of reaction that an interruption of the process is prevented and the reduction is finished within the shortest possible time.

It is true that a comparatively large amount of unused coal and a considerable part of the ore from the auxiliary chamber reduced to magnetite is left over, but this is a natural state of affairs with processes of this kind and does not constitute a commercial disadvantage and moreover these iron remnants can conveniently be used over again with the following charges.

Figures 1 and 2 show in vertical longitudinal section and in plan view a suitable furnace I with a stationary preheating apparatus II and a gas generator III, said furnace being suspended from trunnions and being provided with a sheet metal jacket and a fireproof lining and being closed by a cover e. The head of the reduction vessel or crucible d, the upper part of which consists of refractory clay, while its lower part is made of encaustic tile material, projects through the plate p and is provided at its end with a sieve plate or overlapping cap, serving as a cover. Compressed air of about one atmosphere above the atmospheric pressure is fed through the pipe 1 into the preheating apparatus II by a compressor (not shown) and is there heated by the waste gases passing through the flue 2. The catch nozzle 3 receives for the pipe v the combustion gases, which are discharged from the furnace through the pipe v and which later on escape from the preheating apparatus through the pipe 4. Part of the compressed air is fed through the conduit 5 in the closed generator, which is charged with coke and in which the transformation of the oxygen contained in the compressed air into carbon monoxid gas is effected. The developed generator gas passes through the pipe 6 and the hollow trunnion m into the furnace and is conducted through the pipe f to the twyers b b'. The gas here encounters the preheated air, which, after passing through the hollow trunnion z, is conducted into the conduits g g'. The combustion takes place after the electric ignition device l is operated which can also be used as necessary for reheating the generator gas.

The reduction vessel d, the upper part of which is made of rings of refractory clay or of molded tiles, is encircled by combustion gases which are kept under compression and which afterward are conducted for further utilization through the pipe v into the preheating apparatus. By raising the furnace bottom, the opening of the pipe v can be placed in front of the stationary wall h, when the furnace is to be closed to a larger degree or completely.

The current of the generator gases passing through the pipe m, is augmented after entering the furnace by the admission of the carbon monoxid, which is developed at the reduction of the ore free from nitrogen as waste gas and is discharged from the chamber k through the conduit r.

For putting the furnace in operation the cover e is lifted, after the clamping or other securing devices provided at the top of the furnace are released, and then the crucible d, as far as its lower part consists of encaustic tile material, is charged with broken steel or pure pig iron (which should as nearly as possible be free of sulfur or phosphorus), while upon this charge the broken up iron ore, which is to be reduced, is placed after being mixed with a certain amount of charcoal or peat-charcoal. The fuel chamber k receives inferior coke material or loose porous coal-waste of anthracite or brown coal coke, peat coke or the like—in as large quantities as possible.

After the furnace is closed, the blowing apparatus is set in operation and the gas produced in the previously prepared generator, is ignited at the twyers. Now the reduction of the ore sets in and carbon dioxid the final product of the reduction passes on account of its expansion by the heat into the fuel chamber, in which the annular electric resistance s is disposed, which is inclosed by quartz or refractory clay and consists of a suitable material, for instance silundum. By the electric current passing through the resistance s the temperature in the fuel chamber is soon increased to 900-1000° C. Within the pores of the glowing coal the carbon dioxid, which had entered into the fuel chamber k, is transformed while consuming heat into simple carbon monoxid. The carbon dioxid absorbed by the coal disappears almost completely in its gaseous form. Therefore the carbon dioxid produced below as a result of the reduction, has an opportunity to take its place by expanding and diffusing, that is, to penetrate into the upper portion of the fuel chamber. In the meantime the carbon monoxid produced in the pores of the coal, passes up to fill the coal chamber, occupying its full normal volume. One-half of the carbonic oxid reaches the fire chamber burning there and reducing in volume correspondingly, while the other half penetrates into the ore chamber in which it now occupies the space formerly occupied by the carbon dioxid which has passed upwardly toward the reduction chamber.

In the described manner the circulation of the gases, which characterizes this process and which is made possible by the blower action and the conduct of the combustion gases, this circulation is assisted in regard to the heat supply by moderately heating in the meanwhile the electric resistance at the base of the vessel d, said resistance having a basket like shape and being loosely inclosed in fireproof material and being covered at its top. The increased thickness of the lower wall of the vessel does not form an obstruction for the passage of the heat on account of the addition of electrically produced heat, and besides, the charge to be melted in its interior is a far better heat conductor than the ore disposed above said charge at the thinner walls of the vessel. The closure $x$, which is made of non-conducting material, tends to collect the heat.

When there is danger of a suspension of the operation on account of a decrease of the reacting masses, the feeding devices $y$ $y$ on the furnace cover are operated to add fuel, whereupon finally also a certain amount of pulverized ore is fed into the fuel chamber $k$, this is effected in order to decrease the temperature prevailing above the bath for avoiding a suspension of the operation by the reduction of the carbonic gas into its elementary components. When thus in the vessel $d$, the contents of which are not affected by the new supply, the reduction has again been revived by the increase of material, it is only necessary to deliver a powerful electric current for quickly obtaining a melting bath, which absorbs not only the produced spongy iron from the molten slag, but also absorbs sufficient of the carbon monoxid descending under pressure from above, so that the final reduction takes place within the bath in order to remove all protoxid remnants, which may still be present. It is necessary to maintain during the melting operation as high a degree of pressure as possible as the melting bath can only absorb carbon monoxid in quantities sufficient for occlusion under a higher than atmospheric pressure.

After stopping the blowing apparatus and opening the cover of the furnace, the latter is tilted for performing the casting operation, the reducing vessel being supported in this position by the rib $a$. If the process is to be performed especially economically, it is desirable to retain for the next charge in the vessel $d$ a remnant of the ingot steel obtained and to prepare the same by recarbonization for the following bath.

Figs. 3 and 4 illustrate in vertical section and plan view a furnace, provided with five reducing and melting vessels $d$ $d^1$ $d^2$ $d^3$ $d^4$, grouped around the gas discharge pipe $g^2$ and being heated at their base by gas fire only.

As feeding devices are not provided on the cover, the furnace must be reopened for the purpose of replenishing ore and fuel. For igniting the generator gas at the initial heating of the furnace a wire, the end of which is heated to incandescence, is lowered downwardly into the bore of the base block or bed plate $w$, containing the twyers $u$ $u'$. It is preferable, to move the furnace now and then into an inclined position in order to advance the melting bath toward the fuel chamber for the purpose of causing said bath to absorb the not yet superheated carbon monoxid.

What I claim as new and desire to secure by Letters Patent is:

1. A process for the direct production of iron and steel in a high pressure furnace consisting in first producing spongy iron by accelerating the reduction through the concentration of the carbon monoxid gases, and finally removing all protoxid remnants by the introduction of a powerful electric current increasing the pyrometrical effect, substantially as described and for the purpose set forth.

2. In a high pressure furnace for the direct production of iron and steel, a reduction vessel, means for heating said vessel by a gaseous fuel, an ore chamber within said vessel, heated to reaction temperature by said vessel heating means, a fuel chamber arranged above said vessel, an insulated electric resistance within said fuel chamber for heating the same, and means for conducting compressed and preheated air and gas to the furnace, substantially as described.

3. In a high pressure furnace for the direct production of iron and steel, a reduction vessel, means for heating said vessel by a gaseous fuel, a fuel chamber arranged above said reduction vessel and receiving solid fuel and adapted to be heated by an electric resistance, a second electric resistance arranged at the base of said reduction vessel and adapted to heat the lowermost part of the furnace, and feeding devices adapted to feed solid fuel and pulverized ore into the fuel chamber in order to revive the reducing operation, substantially as described.

In testimony whereof I affix my signature in presence of two witnesses.

CARL OTTO.

Witnesses:
PAUL ARRAS,
CLÄRE SIMON.